United States Patent
Fan et al.

(10) Patent No.: US 12,068,787 B1
(45) Date of Patent: Aug. 20, 2024

(54) LASER SIGNAL TRANSMISSION SYSTEM

(71) Applicant: Shenzhen Zhiyong Electronics Co., Ltd., Shenzhen (CN)

(72) Inventors: Xiaoming Fan, Shenzhen (CN); Jiawei Fan, Shenzhen (CN)

(73) Assignee: SHENZHEN ZHIYONG ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 18/531,874

(22) Filed: Dec. 7, 2023

(30) Foreign Application Priority Data

Aug. 15, 2023 (CN) .......................... 202311026628.4

(51) Int. Cl.
*H04B 10/00* (2013.01)
*H04B 10/25* (2013.01)
*H04B 10/50* (2013.01)
*H04B 10/508* (2013.01)

(52) U.S. Cl.
CPC ....... *H04B 10/50597* (2013.01); *H04B 10/25* (2013.01); *H04B 10/508* (2013.01)

(58) Field of Classification Search
CPC H04B 10/40; H04B 10/2507; H04B 10/5057; H04B 10/50597; H04B 10/5059; H04B 10/516; H04B 10/503; H04B 10/504; H04B 10/508; H04B 10/25; H04B 10/69; H04B 10/6931; H04B 10/6972
USPC ....... 398/135, 136, 137, 138, 139, 158, 159, 398/183, 188, 187, 186, 192, 193, 194, 398/195, 196, 198, 202, 208, 209, 33, 38, 398/25, 26, 27; 372/32, 34, 36, 38.01, 372/38.02, 38.07
See application file for complete search history.

(56) References Cited

U.S. PATENT DOCUMENTS

| | | | |
|---|---|---|---|
| 6,192,060 B1 * | 2/2001 | Kobayashi | H01S 5/06835 372/38.07 |
| 7,492,797 B2 * | 2/2009 | Uesaka | H01S 5/0683 372/38.01 |
| 2004/0052535 A1 * | 3/2004 | Nohara | H04B 10/11 398/189 |
| 2013/0163995 A1 * | 6/2013 | Uemura | H04B 10/504 398/208 |

* cited by examiner

*Primary Examiner* — Hanh Phan
(74) *Attorney, Agent, or Firm* — IPRO, PLLC

(57) ABSTRACT

A laser transmission system includes: a modulation module, a voltage-current conversion module, an electro-optic conversion module, an optic-electro conversion module, and a control module. The modulation module is configured to modulate an input voltage, and output a first voltage. An average value of the first voltage within a first duration is 0. The voltage-current conversion module is configured to output a first current based on the first voltage. The electro-optic conversion module is configured to output an optical signal corresponding to the first current. The optic-electro conversion module is configured to receive the optical signal from the analog optical fiber, and output a second voltage based on the optical signal. The control module is configured to determine an average value of the second voltage, and determine an electro-optic conversion coefficient of the electro-optic conversion module based on the average value of the second voltage.

12 Claims, 6 Drawing Sheets

LASER SIGNAL TRANSMISSION SYSTEM

TECHNICAL FIELD OF THE INVENTION

The present disclosure relates to the technical field of signal transmission, and in particular, relates to a laser signal transmission system.

BACKGROUND OF THE INVENTION

At present, an optical fiber signal transmission system is constituted by three parts. These three parts include a transmitter configured to convert electrical signals to optical signals, a receiver configured to convert optical signals to electrical signals, and an analog optical fiber configured to connect the transmitter to the receiver and transmit the optical signals. Merits of transmitting signals over the analog optical fiber include strong anti-interference performance, and capabilities of withstanding a very high voltage.

An electro-optic conversion module configured to convert electrical signals to optical signals is arranged in the transmitter, for example, a laser diode. In the course of transmission of analog signals over the optical fiber, an electro-optic conversion coefficient of the electro-optic conversion module is subject to a drift, and consequently a transmission accuracy is poor.

SUMMARY OF THE INVENTION

In one aspect, the present disclosure provides a laser signal transmission system. The system includes:
- a modulation module, connected to an input voltage and configured to modulate the input voltage and output a first voltage, wherein an average value of the first voltage within a first duration is 0, the first duration being greater than or equal to one modulation period;
- a voltage-current conversion module, connected to the modulation module and configured to output a first current based on the first voltage;
- an electro-optic conversion module, connected to the voltage-current conversion module and configured to output an optical signal corresponding to the first current, wherein the optical signal is transmitted over an analog optical fiber;
- an optic-electro conversion module, configured to receive the optical signal from the analog optical fiber and output a second voltage based on the optical signal; and
- a control module, connected to the optic-electro conversion module and configured to determine an average value of the second voltage and determine an electro-optic conversion coefficient of the electro-optic conversion module based on the average value of the second voltage.

In an optional embodiment, the control module is further configured to:
- acquire a threshold current of the electro-optic conversion module, wherein in response to a current flowing through the electro-optic conversion module being less than the threshold current, the electro-optic conversion module stops operating.
- acquire a static operating current of the electro-optic conversion module, wherein in response to the input voltage being 0, the current flowing through the electro-optic conversion module is the static operating current; and
- determine the electro-optic conversion coefficient as $K=V20/(Is-Ith)$, wherein V20 represents the average value of the second voltage, Is represents the static operating current, and Ith represents the threshold current.

In an optional embodiment, the optic-electro conversion module is further configured to output a third voltage corresponding to the optical signal, and amplify the third voltage and output the second voltage; and
the control module is further configured to receive a reference voltage, and adjust a magnification at which the third voltage is amplified by the optic-electro conversion module until it is determined that the reference voltage is equal to the average value of the second voltage.

In an optional embodiment, the system further includes: a subtraction module;
wherein the subtraction module is connected to the optic-electro conversion module, and is configured to receive the reference voltage and output a fourth voltage based on a difference between the second voltage and the reference voltage.

In an optional embodiment, the system further includes: a demodulation module;
wherein the demodulation module is connected to the subtraction module, and is configured to demodulate the fourth voltage and derive a first output voltage, wherein a demodulation logic of the demodulation module is the same as a modulation logic of the modulation module.

In an optional embodiment, the system further includes: a pulse generation module;
wherein the pulse generation module is connected to the modulation module and the demodulation module, and is configured to output a first pulse signal to the modulation module and the demodulation module, wherein a duty cycle of the first pulse signal is 50%.

In an optional embodiment, the modulation module further includes an inverter and a switch; wherein
an input terminal of the inverter is connected to the input voltage and a first terminal of the switch, an output terminal of the inverter is connected to a second terminal of the switch, a third terminal of the switch is connected to the voltage-current conversion module, and the switch is under control of the first pulse signal;
the inverter is configured to invert the input voltage; and
the switch is configured to establish a connection between the input voltage and the voltage-current conversion module in response to the first pulse signal being at a high level, and is configured to establish a connection between the output terminal of the inverter and the voltage-current conversion module in response to the first pulse signal being at a low level.

In an optional embodiment, the modulation module further includes a multiplier and a signal conversion unit; wherein
the signal conversion unit is connected to the pulse generation module, and is configured to convert the first pulse signal to a second pulse signal, wherein voltages corresponding to a high level and a low level of the second pulse signal are equal but with opposite polarities; and
the multiplier is connected to the input voltage and the signal conversion unit, and is configured to output a product of the input voltage and the second pulse signal.

In an optional embodiment, the voltage-current conversion module includes a first amplifier, a power transistor, and a resistor; wherein a first input terminal of the first amplifier is connected to the modulation module, a second input terminal of the first amplifier is connected to an emitter of the power transistor and a first terminal of the resistor, an output terminal of the first amplifier is connected to a base of the power transistor, a collector of the power transistor is connected to a first terminal of the electro-optic conversion module, a second terminal of the electro-optic conversion module is connected to a positive power source, and a second terminal of the resistor is connected to a negative power source; and the first amplifier is configured to amplify the first voltage and input the amplified first voltage to the power transistor, such that the power transistor is turned on and the first current is generated, wherein the first current flows through the resistor and the electro-optic conversion module.

In an optional embodiment, the electro-optic conversion module includes a laser diode; wherein wherein a first terminal of the laser diode is connected to a positive power source, and a second terminal of the laser diode is connected to the voltage-current conversion module.

In an optional embodiment, the optic-electro conversion module includes a photodiode and a second amplifier; wherein the photodiode is configured to receive the optical signal from the analog optical fiber, and convert the optical signal to the third voltage; and the second amplifier is connected to the photodiode, and is configured to amplify the third voltage and output the second voltage.

In an optional embodiment, the control module includes a first low-pass filter, a first capacitor, and a third amplifier; wherein an input terminal of the first low-pass filter is connected to the optic-electro conversion module, an output terminal of the first low-pass filter is connected to a first terminal of the first capacitor and a second input terminal of the third amplifier, the reference voltage is input to a first input terminal of the third amplifier, and an output terminal of the third amplifier is connected to a second terminal of the first capacitor and the optic-electro conversion module;

the first low-pass filter is configured to perform low-pass filtering on the second voltage to output the average value of the second voltage to the third amplifier; and a combination of the third amplifier and the first capacitor is configured to adjust, based on the reference voltage and the average value of the second voltage, the magnification at which the third voltage is amplified by the optic-electro conversion module until the reference voltage is equal to the average value of the second voltage.

The present disclosure achieves the following beneficial effects: The laser signal transmission system includes: a modulation module, a voltage-current conversion module, an electro-optic conversion module, an optic-electro conversion module, and a control module. The modulation module is connected to an input voltage, and is configured to modulate the input voltage and output a first voltage. An average value of the first voltage within a first duration is 0, wherein the first duration is greater than or equal to one modulation period. The voltage-current conversion module is connected to the modulation module, and is configured to output a first current based on the first voltage. The electro-optic conversion module is connected to the voltage-current conversion, and is configured to output an optical signal corresponding to the first current. The optical signal is transmitted over an analog optical fiber. The optic-electro conversion module is configured to receive the optical signal from the analog optical fiber, and output a second voltage based on the optical signal. The control module is configured to determine an average value of the second voltage, and determine an electro-optic conversion coefficient of the electro-optic conversion module based on the average value of the second voltage. In summary, since the input voltage is modulated to the first voltage, and the average value of the first voltage within the first duration is 0, the average value of the second voltage is not correlated to the input voltage, but is only correlated to the electro-optic conversion coefficient. As such, the electro-optic conversion coefficient can be determined based on the average value of the second voltage. Subsequently, whether the electro-optic conversion coefficient is subjected to a temperature drift can be determined, and hence a change of the electro-optic conversion coefficient due to the temperature drift can be compensated, thereby facilitating improvement of a transmission accuracy.

BRIEF DESCRIPTION OF DRAWINGS

One or more embodiments are illustrated by way of example, and not by limitation, in the accompanying drawings, wherein components having the same reference numeral designations represent like components throughout. The drawings are not to scale, unless otherwise disclosed.

DETAILED DESCRIPTION OF THE INVENTION

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. Based on the embodiments of the present disclosure, all other embodiments derived by persons of ordinary skill in the art without any creative efforts shall fall within the protection scope of the present disclosure.

Figure 1:
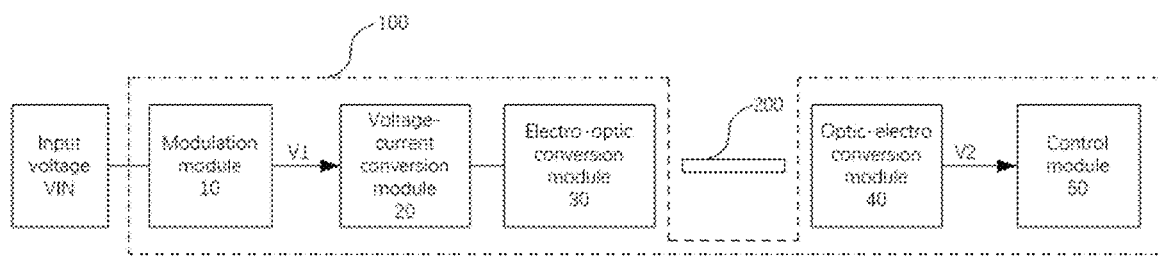
FIG. 1 is a schematic structural diagram of a laser signal transmission system according to a first embodiment of the present disclosure.

Referring to FIG. 1, FIG. 1 is a schematic structural diagram of a laser signal transmission system 100 according to an embodiment of the present disclosure. As illustrated in FIG. 1, the laser signal transmission system 100 includes: a modulation module 10, a voltage-current conversion module 20, an electro-optic conversion module 30, an optic-electro conversion module 40, and a control module 50.

The modulation module 10 is connected to an input voltage VIN. The voltage-current conversion module 20 is connected to the modulation module 10. The electro-optic conversion module 30 is connected to the voltage-current conversion module 20. The control module 50 is connected to the optic-electro conversion module 40. Specifically, a first terminal of the modulation module 10 is connected to the input voltage VIN, a second terminal of the modulation module 10 is connected to a first terminal of the voltage-current conversion module 20, a second terminal of the voltage-current conversion module 20 is connected to a first terminal of the electro-optic conversion module 30, and a first terminal of the optic-electro conversion module 40 is connected to the control module 50.

Specifically, the modulation module 10 is configured to modulate the input voltage VIN, and output a first voltage V1. An average value of the first voltage V1 within a first duration is 0, wherein the first duration is greater than or equal to one modulation period. The modulation period is a period of a signal for modulating the input voltage VIN. The voltage-current conversion module 20 is configured to output a first current ILD1 based on the first voltage V1. The electro-optic conversion module 30 is configured to output an optical signal corresponding to the first current. The optical signal is transmitted over an analog optical fiber. The optical signal corresponding to the first current means that the optical signal is in proportion to the first current. For example, the optical signal is in direct proportion to the first current. The optic-electro conversion module 40 is configured to receive the optical signal from the analog optical fiber, and output a second voltage V2 based on the optical signal. The control module 50 is configured to determine an average value of the second voltage V2, and determine an electro-optic conversion coefficient K of the electro-optic conversion module 30 based on the average value of the second voltage V2.

In this embodiment, since the second voltage V2 is derived by subjecting the first voltage V1 successively to the voltage-current conversion module 20, the electro-optic conversion module 30, and the optic-electro conversion module 40, the second voltage V2 is correlated to both the first voltage V1 and the electro-optic conversion coefficient K of the electro-optic conversion module 30, and hence it is derived that the average value of the second voltage V2 is also correlated to the average value of the first voltage V1 and the electro-optic conversion coefficient K. Subsequently, according to the embodiments of the present disclosure, the input voltage VIN is further modulated to the first voltage V1, the average value of the first voltage V1 within the first duration is 0, and hence the average value of the second voltage V2 is not correlated to the input voltage VIN, but is only correlated to the electro-optic conversion coefficient. Accordingly, the electro-optic conversion coefficient K can be determined based on the average value of the second voltage V2, thus whether the electro-optic conversion coefficient K is subjected to a temperature drift can be determined, and hence a change of the electro-optic conversion coefficient K due to the temperature drift can be compensated, thereby facilitating improvement of a transmission accuracy.

Figure 2:
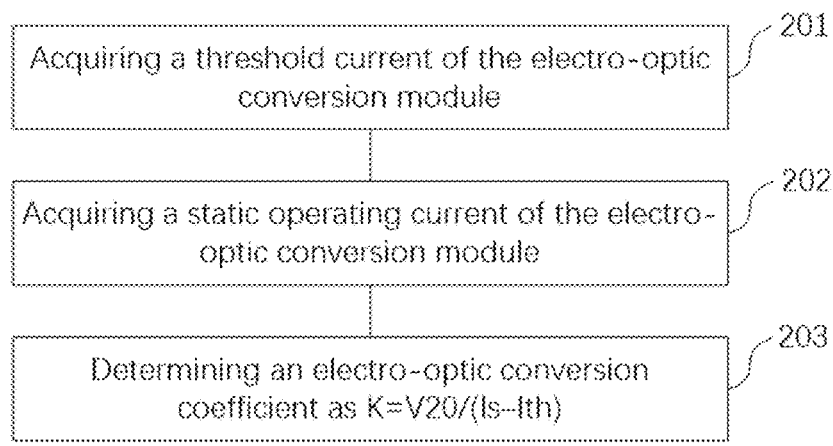
FIG. 2 is a flowchart of a method performed by a control module according to the first embodiment of the present disclosure.

An embodiment of the present disclosure further provides an approach to determine the electro-optic conversion coefficient K. The specific implementation process is as illustrated in FIG. 2, and the control module 50 is further configured to perform the following steps.

In step 201, a threshold current of the electro-optic conversion module is acquired.

In response to a current flowing through the electro-optic conversion module 30 is less than the threshold current, the electro-optic conversion module 30 stops operating. In other words, the threshold current is a minimum operating current of the electro-optic conversion module 30, and the electro-optic conversion module 30 is capable of outputting an optical signal only in response to the current flowing through the electro-optic conversion module 30 being greater than or equal to the threshold current. The threshold current is correlated to characteristics of the electro-optic conversion module 30.

Figure 3:
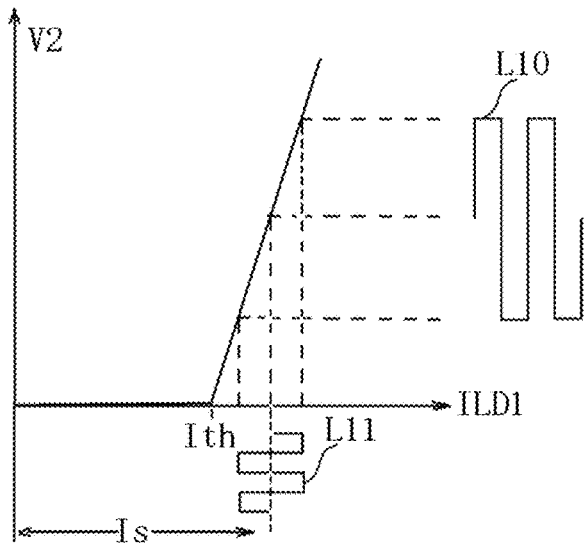
FIG. 3 is a schematic diagram of an implementation of a second voltage and a first current according to the first embodiment of the present disclosure.

Referring to FIG. 3, FIG. 3 exemplarily illustrates an implementation of the first current and the second voltage. As illustrated in FIG. 3, a horizontal coordinate represents the first current ILD1, and a vertical coordinate represents the second voltage V2.

As illustrated in FIG. 3, before the first current ILD1 is increased to be equal to the threshold current Ith, the electro-optic conversion module 30 does not output any optical signal, and in this case, the second voltage V2 remains 0. After the first current ILD1 is increased to be greater than the threshold current Ith, the second voltage V2 is also increased with the increase of the first current ILD1.

In step 202, a static operating current of the electro-optic conversion module is acquired.

When the input voltage VIN is 0, the current flowing through the electro-optic conversion module 30 is the static operating current.

Still referring to FIG. 3, Is represents the static operating current. By defining the static operating current Is for the electro-optic conversion module 20, when the input voltage VIN is input to the signal transmission system, the operating current of the electro-optic conversion module 20 is capable of fluctuating within a linear interval about the static operating current Is, such that the second voltage V2 is also linearly changed. As such, the second voltage V2 is not subject to any signal distortion.

In step 203, an electro-optic conversion coefficient K is determined as K=V20/(Is−Ith).

V20 represents the average value of the second voltage, Is represents the static operating current, and Ith represents the threshold current.

Specifically, still referring to FIG. 3, after the first current ILD1 is increased to be greater than the threshold current Ith, the second voltage V2 is also increased with the increase of the first current ILD1. In addition, the first current ILD1 is in direct proportion to the second voltage V2. For example, when a waveform of the first current ILD1 is as illustrated by a curve L10, a waveform of the second voltage V2 is as illustrated by a curve L11. Apparently, the waveform of the first current ILD1 is in direct proportion to the waveform of the second voltage V2, and the value of the proportion is the electro-optic conversion coefficient K of the electro-optic conversion module 30. Therefore, upon determination of the first current ILD1 and the second voltage V2, the electro-optic conversion coefficient K of the electro-optic conversion module 30 may be calculated as $$K=V2/(ILD1-Ith) \quad (1).$$

By taking average values on both sides of Formula (1), the following formula is derived:

$$K=V20/(Is-Ith) \quad (2).$$

The average value of K is still K; the average value of V2 is V20; the average value of ILD1 is the static operating current Is; and the threshold current Ith is a constant, and thus the average value is still Ith. In Formula (2), the static operating current Is and the threshold current Ith are both constants. Therefore, for calculation of the electro-optic conversion coefficient K of the electro-optic conversion module 30, the average value V20 of the second voltage V2 only needs to be determined.

In addition, from another perspective, when the electro-optic conversion coefficient K of the electro-optic conversion module 30 is changed due to a temperature drift, the average value V20 of the second voltage V2 may also be changed accordingly. Based on this, the average value V20 of the second voltage V2 is acquired in real time, and whether the electro-optic conversion coefficient K of the electro-optic conversion module 30 is changed due to the temperature drift is also determined in real time, such that a timely compensation is made to the change of the electro-optic conversion coefficient K due to the temperature drift to improve a transmission accuracy.

Figure 4:
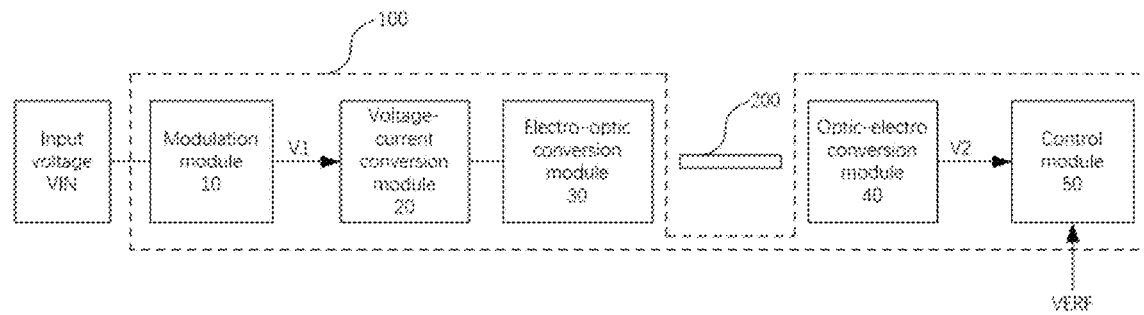
FIG. 4 is a schematic structural diagram of a laser signal transmission system according to a second embodiment of the present disclosure.

In some embodiments, the optic-electro conversion module 40 is further configured to output a third voltage corresponding to the optical signal, and amplify the third voltage and output the second voltage V2. As illustrated in FIG. 4, the control module 50 is further configured to receive a reference voltage VREF, and adjust a magnification at which the third voltage is amplified by the optic-electro conversion module 40 until it is determined that the reference voltage VREF is equal to the average value V20 of the second voltage V2.

In this embodiment, the optic-electro conversion module 40 achieves two functions: A first function is to convert a received optical signal to an electrical signal (that is, the third voltage), and a second function is amplify the third voltage and output the second voltage V2.

The control module 50 adjusts the magnification at which the third voltage is amplified by the optic-electro conversion module 40 to adjust the second voltage V2. Hence, the average value V20 of the second voltage V2 is adjusted until the average value V20 of the second voltage V2 is equal to the reference voltage VREF. In this case, the control module 50 stops adjusting the magnification at which the third voltage is amplified by the optic-electro conversion module 40. This is equivalent to a case where the average value V20 of the second voltage V2 is defined to be the reference voltage VREF. As known from the above embodiments, the average value V20 of the second voltage V2 may determine the electro-optic conversion coefficient K. In conclusion, the reference voltage VREF may be employed to configure the electro-optic conversion coefficient K. Specifically, the reference voltage VREF=V20 may be introduced to Formula (2) to derive K=VREF/(Is-Ith) (3). As known from Formula (3), the electro-optic conversion coefficient K is defined as long as the reference voltage VREF is defined according to the actual needs. In addition, the electro-optic conversion coefficient K herein refers to an electro-optic conversion coefficient with respect to the entire laser signal transmission system 100, instead of the electro-optic conversion coefficient of the electro-optic conversion module 30. In other words, as long as the reference voltage VREF remains unchanged, no matter how the electro-optic conversion coefficient of the electro-optic conversion module 30 is changed due to the temperature drift, the electro-optic conversion coefficient of the entire laser signal transmission system 100 remains unchanged, such that the laser signal transmission system 100 remains a higher transmission accuracy.

Figure 5:
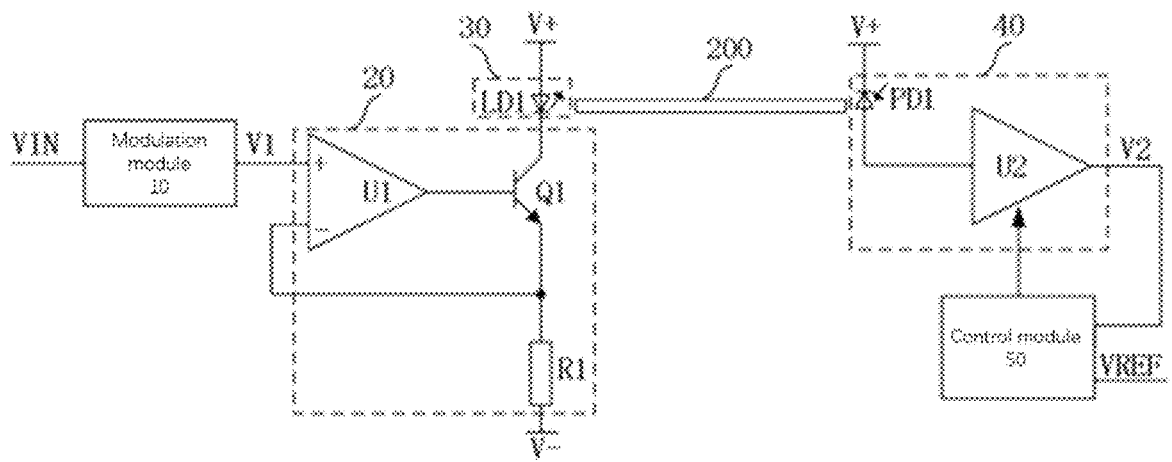
FIG. 5 is a schematic structural diagram of circuitry of the laser signal transmission system according to the first embodiment of the present disclosure.

Referring to FIG. 5, FIG. 5 exemplarily illustrates a structure of a voltage-current conversion module 20. As illustrated in FIG. 5, the voltage-current conversion module 20 includes: a first amplifier U1, a power transistor Q1, and a resistor R1.

A first input terminal of the first amplifier U1 is connected to the modulation module 10, a second input terminal of the first amplifier U1 is connected to an emitter of the power transistor Q1 and a first terminal of the resistor R1, an output terminal of the first amplifier U1 is connected to a base of the power transistor Q1, a collector of the power transistor Q1 is connected to a first terminal of the electro-optic conversion module 30, a second terminal of the electro-optic conversion module 30 is connected to a positive power source V+, and a second terminal of the resistor R1 is connected to a negative power source V−. In this embodiment, description is given using a case where the first input terminal of the first amplifier U1 is a non-inverting input terminal and the second input terminal of the first amplifier U1 is an inverting input terminal as an example.

Specifically, the first amplifier U1 is configured to amplify the first voltage V1, and inputs the amplified first voltage to the power transistor Q1, such that the power transistor Q1 is turned on and the first current ILD1 is generated. The first current ILD1 flows through the resistor R1 and the electro-optic conversion module 30.

In this embodiment, in accordance with the characteristics of virtual short circuit and virtual break of the first amplifier U1, voltages at the two input terminals of the first amplifier U1 may be eventually equal to each other. Therefore, the input voltage VIN is equal to a voltage at the first terminal of the resistor R1. A voltage at the second terminal of the resistor R1 is a voltage supplied by the negative power source V−. In this case, the first current ILD1(VIN−V−)/r1, wherein r1 represents a resistance of the resistor R1.

When the input voltage VIN is 0, the first current ILD1=−V−/r1. In this case, the first current ILD1 is marked as a static operating current Is of the electro-optic conversion module 20. By adjusting the voltage supplied by the negative power source V−, the static operating current Is may be adjusted.

In an embodiment, the electro-optic conversion module 30 includes a laser diode LD1.

A first terminal of the laser diode LD1 is connected to the positive power source V+, and a second terminal of the laser diode LD1 is connected to the voltage-current conversion module 20.

Specifically, the laser diode LD1 is a semiconductor laser device, which is also referred to as a laser diode (LD). The laser diode LD1 generates and amplifies a laser beam using a semiconductor material. The laser diode LD1 operates to inject a current to the semiconductor material to cause the semiconductor material to generate a stimulated radiation and amplify the stimulated radiation to a laser (that is, outputting an optical signal).

In an embodiment, the optic-electro conversion module 40 includes a photodiode PD1 and a second amplifier U2. A first terminal of the photodiode PD1 is connected to the positive power source V+, and an input terminal of the second amplifier U2 is connected to a second terminal of the photodiode PD1.

Specifically, the photodiode PD1 is configured to receive an optical signal from an analog optical fiber 200, and convert the optical signal to the third voltage. The second amplifier U2 is configured to amplify the third voltage, and output the second voltage V2. In the above embodiments, the control module 50 adjusts the magnification at which the third voltage is amplified by the optic-electro conversion module 40, that is, the control module 50 adjusts the magnification of the second amplifier U2. Hence, with an adjustment of the magnification of the second amplifier U2, the second voltage V2 is changed, and the average value V20 of the second voltage V2 is also changed. The change stops until the average value V20 of the second voltage V2 is equal to the reference voltage VREF. In one aspect, a negative feedback adjustment is implemented to maintain stability of the electro-optic conversion coefficient K; and in another aspect, the electro-optic conversion coefficient K is prevented from being changed due to the temperature drift, such that the transmission accuracy is improved.

Figure 6:
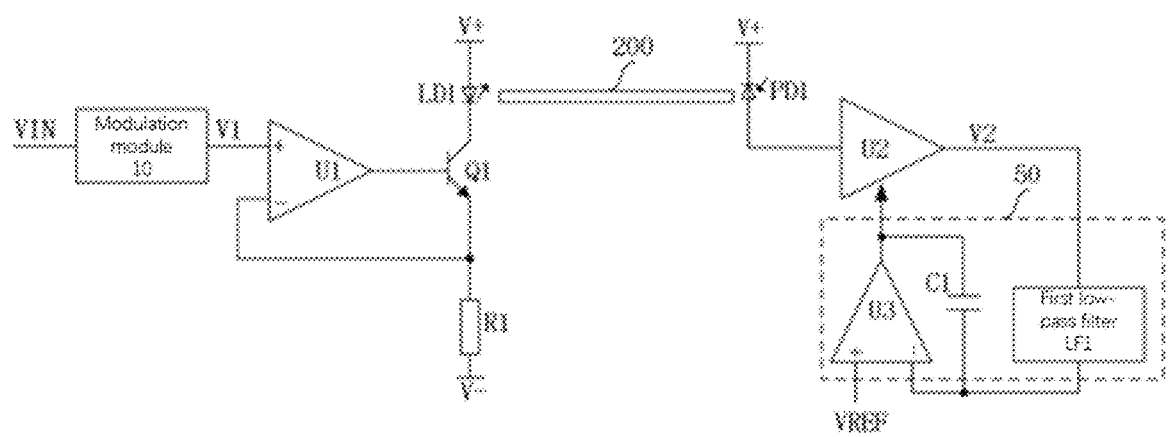
FIG. 6 is a schematic structural diagram of circuitry of the laser signal transmission system according to the second embodiment of the present disclosure.

Referring to FIG. 6, FIG. 6 exemplarily illustrates a structure of the control module 50. As illustrated in FIG. 6, the control module includes a first low-pass filter LF1, a first capacitor C1, and a third amplifier U3.

An input terminal of the first low-pass filter LF1 is connected to an output terminal of the second amplifier U2 in the optic-electro conversion module 40, an output terminal of the first low-pass filter LF1 is connected to a first terminal of the first capacitor C1 and a second input terminal of the third amplifier U3, the reference voltage VREF is input to a first input terminal of the third amplifier U3, and an output terminal of the third amplifier U3 is connected to a second terminal of the first capacitor C1 and the optic-electro conversion module 40. In this embodiment, description is given using a case where the first input terminal of the third amplifier U3 is a non-inverting input terminal and the second input terminal of the third amplifier U3 is an inverting input terminal as an example.

Specifically, the first low-pass filter LF1 is configured to perform low-pass filtering on the second voltage V2 to output the average value of the second voltage V2 to the third amplifier U3. A combination of the third amplifier U3 and the first capacitor C1 is configured to adjust, based on the reference voltage VREF and the average value of the second voltage V2, the magnification at which the third voltage is amplified by the optic-electro conversion module 40 until the reference voltage VREF is equal to the average value of the second voltage V2.

In this embodiment, the third amplifier U3 and the first capacitor C1 constitute a negative feedback error amplifier. The first capacitor C1 is an error integral capacitor. After the second voltage V2 is filtered by the first low-pass filter LF1, the average value V20 of the second voltage V2 is derived. The average value V20 is input to an inverting input terminal of the third amplifier U3, and the reference voltage VREF is input to a non-inverting input terminal of the third amplifier U3. A first output voltage of the third amplifier U3 is input to a gain control terminal of the second amplifier U2 to control a gain of the second amplifier U2 (that is, to control the magnification of the second amplifier U2).

As known from Formula (2) in the above embodiments, the average value V20 is changed with the change of the electro-optic conversion coefficient K. Specifically, when the average value V20 is decreased as the electro-optic conversion coefficient K is changed due to the temperature drift, a voltage output by the third amplifier U3 is increased, such that the gain of the second amplifier U2 is increased, and hence the average value V20 is increased; and when the average value V20 is increased as the electro-optic conversion coefficient K is changed due to the temperature drift, the voltage output by the third amplifier U3 is decreased, such that the gain of the second amplifier U2 is decreased, and hence the average value V20 is decreased. The average value V20 is equal to the reference voltage VREF until the entire closed-loop adjustment reaches a stable state.

It should be noted that the hardware structure of the laser signal transmission system 100 as illustrated in FIG. 4 to FIG. 6 is only an example, and the laser signal transmission system 100 may have more or fewer components than those as illustrated in the drawings. Two or more components may be combined, or different component configurations may be provided. The various components illustrated in the drawings may be implemented in hardware, software, or a combination of hardware and software, including one or more signal processing and/or dedicated integrated circuits.

Figure 7:
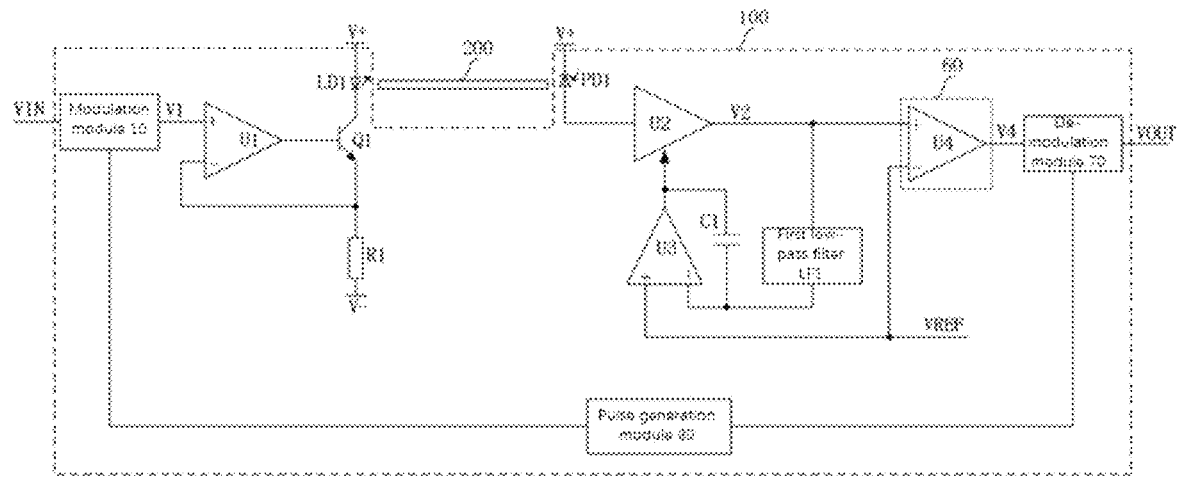
FIG. 7 is a schematic structural diagram of circuitry of a laser signal transmission system according to a third embodiment of the present disclosure.

For example, in an embodiment, as illustrated in FIG. 7, the laser signal transmission system 100 further includes a subtraction module 60.

The subtraction module 60 is connected to the optic-electro conversion module 40. The subtraction module 60 is configured to receive the reference voltage VREF, and output a fourth voltage V4 based on a difference between the second voltage V2 and the reference voltage VREF.

In this embodiment, the second voltage V2 includes a direct current voltage signal corresponding to the static operating current Is of the laser diode LD1, and the direct current voltage signal is the average value V20 of the second voltage V2. In the meantime, as known from the above embodiments, the average value V20 is equal to the reference voltage VREF in the case that the entire closed-loop adjustment in the control module 50 reaches a stable state. In summary, the direct current voltage signal corresponding to the static operating current Is of the laser diode LD1 is the reference voltage VREF. Therefore, by configuring the subtraction module 60 to subtract the voltage (that is, the reference voltage VREF) corresponding to the static operating current Is from the second voltage V2, the fourth voltage V4 that is in direct proportion to the first voltage V1 is derived.

In some embodiments, the subtraction module 60 includes a subtracter U4. A non-inverting input terminal of the subtracter U4 is connected to the output terminal of the second amplifier U2 to input the second voltage V2, the reference voltage VREF is input to an inverting input terminal of the subtracter U4, and an output terminal of the subtracter U4 outputs the fourth voltage V4.

In an embodiment, the laser signal transmission system 100 further includes a demodulation module 70.

The demodulation module 70 is connected to the subtraction module 60. The demodulation module 70 is configured to demodulate the fourth voltage V4 to derive a first output voltage VOUT. A demodulation logic of the demodulation module 70 is the same as a modulation logic of the modulation module 10, to ensure that the fourth voltage V4 is demodulated.

In an embodiment, the laser signal transmission system 100 further includes a pulse generation module 80.

The pulse generation module 80 is connected to both the modulation module 10 and the demodulation module 70. The pulse generation module 80 is configured to output a first pulse signal to both the modulation module 10 and the demodulation module 70. A duty cycle of the first pulse signal is 50%.

Figure 8:
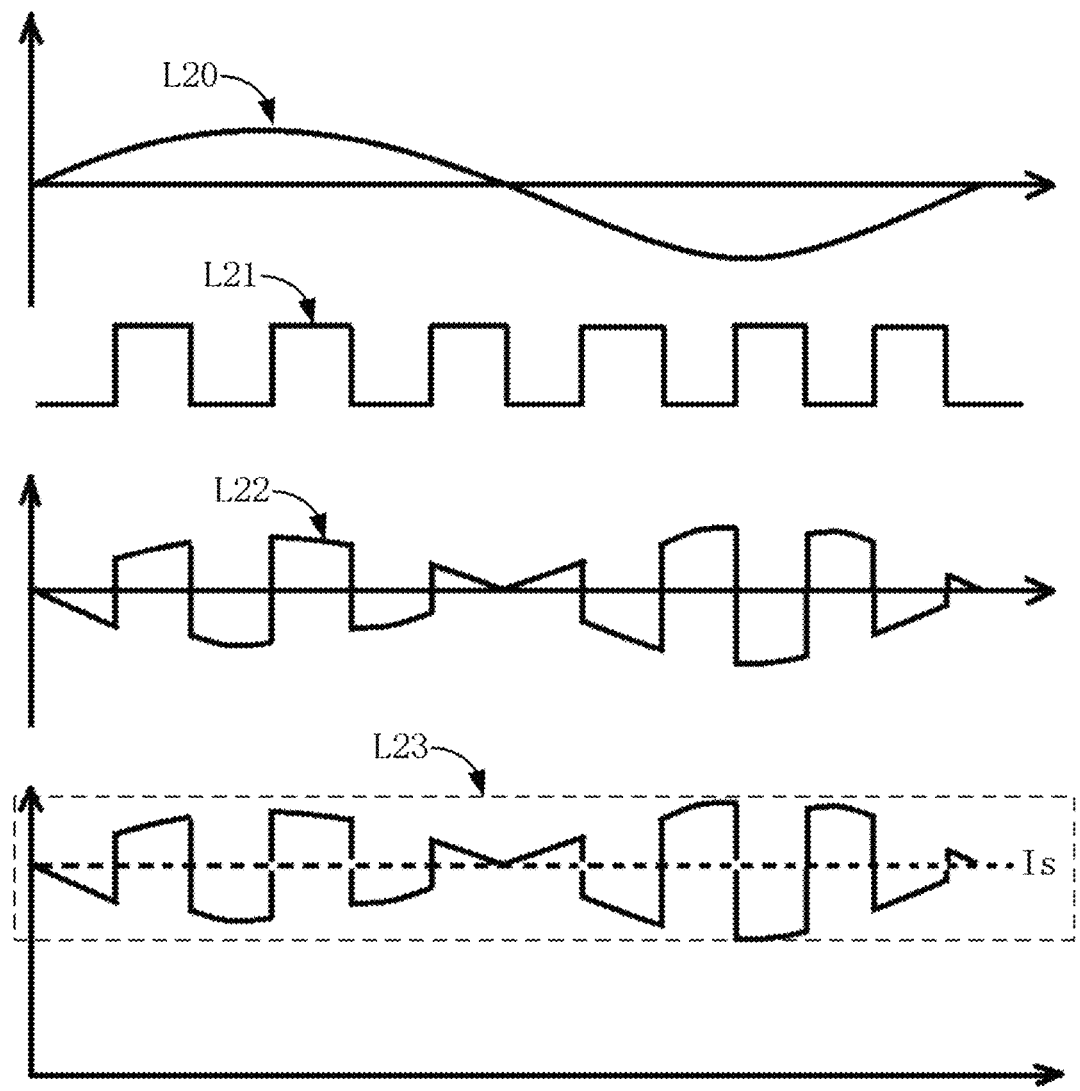
FIG. 8 is a schematic diagram of various signals in the laser signal transmission system according to the first embodiment of the present disclosure.
Figure 9:
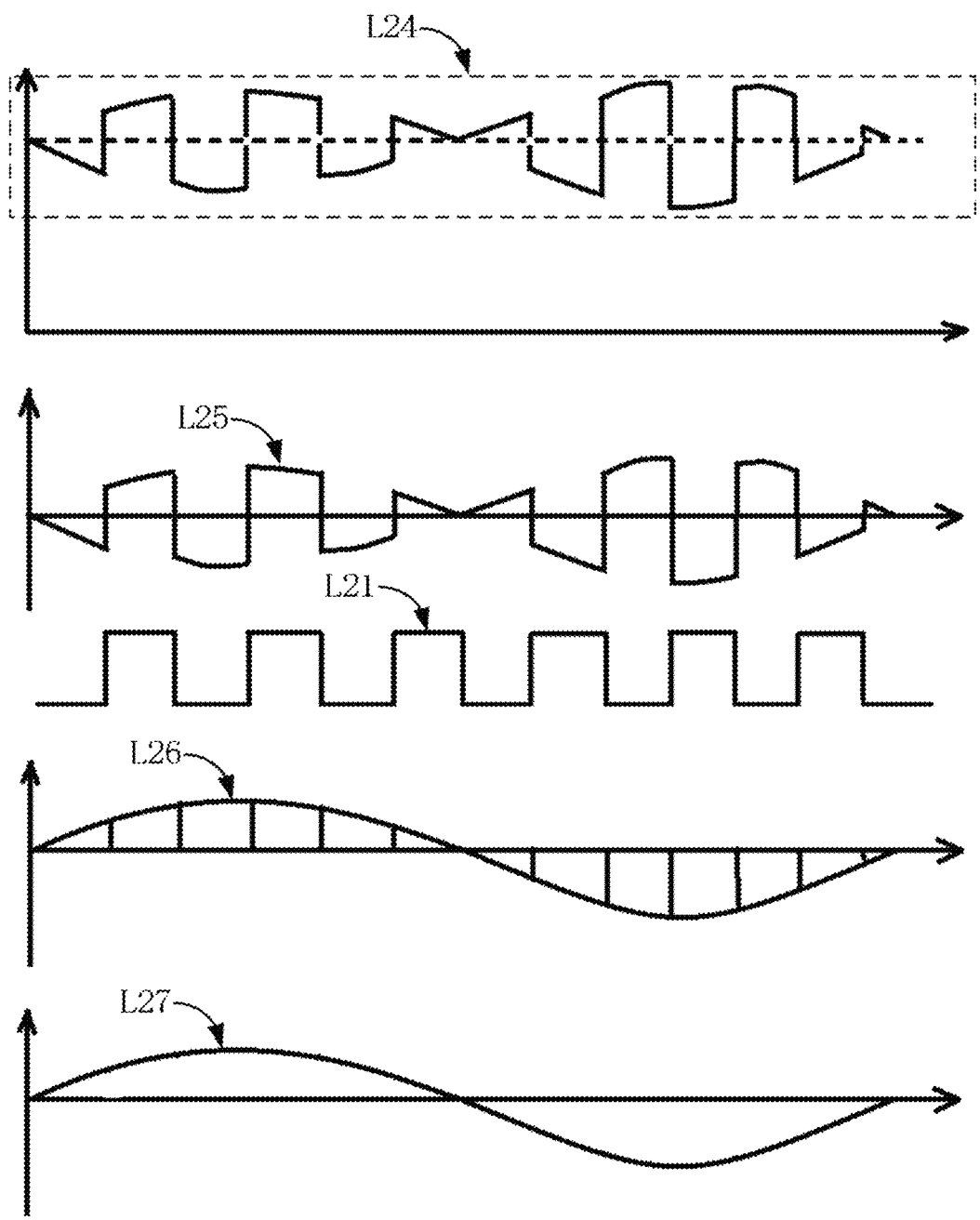
FIG. 9 is a schematic diagram of various signals in the laser signal transmission system according to the second embodiment of the present disclosure.

Hereinafter, the operating principle of the laser signal transmission system 100 as illustrated in FIG. 7 is described with reference to FIG. 8 and FIG. 9. As illustrated in FIG. 8, a curve L20 represents the input voltage VIN (herein a form of the input voltage VIN is only exemplarily illustrated, and in other embodiments, the input voltage VIN may also be in other forms, which is not limited in the embodiments of the present disclosure); a curve L21 represents the first pulse signal; a curve L22 represents the first voltage V1; and a curve L23 represents the first current ILD1. As illustrated in FIG. 9, a curve L24 represents the second voltage V2; a curve L25 represents the fourth voltage V4; and a curve L26 represents the first output voltage VOUT.

Specifically, since the duty cycle of the first pulse signal is 50%, the modulation logic of the modulation module 10 is as follows: when the first pulse signal is at a high level (marked as 1), V1=VIN; and when the first pulse signal is at a low level (marked as 0), V1=−VIN. Therefore, upon modulation by the modulation module 10, the input voltage VIN is converted to the first voltage V1. The average value of the first voltage V1 within a first duration is 0. The first duration is greater than or equal to one modulation period. The modulation period refers to a period of the first pulse signal. The greater the first duration, the more the average value of the first voltage V1 is stabilized to 0. In practice, the first duration is generally defined to be greater than or equal to 1000 modulation periods, to ensure that the average value of the first voltage V1 is 0. The waveform of the first current ILD1 is practically constituted by two parts. A first part is derived based on the first voltage V1, and a second part is the static operating current Is. Since the average value of the first voltage V1 is 0, the average value of the first current ILD1 is the static operating current Is.

Then, the first current ILD1 acts on the laser diode LD1 to output an optical signal. The optical signal is transmitted to the photodiode PD1 over the analog optical fiber 200. The photodiode PD1 converts the optical signal to the third voltage. The third voltage is amplified by the second amplifier U2, and then the second voltage V2 is input. The second voltage V2 likewise includes two parts. A first part is derived based on the first voltage V1, and a second part is a direct voltage derived based on the static operating current Is. Based on the above, the average value of the first current ILD1 is the static operating current Is. Therefore, in the second voltage V2, the direct current voltage corresponding to the static operating current Is is the average value V20 of the second voltage V2. The average value V20 is eventually equal to the reference voltage VREF. Therefore, the direct current voltage corresponding to the static operating current Is is the reference voltage VREF. Afterwards, the reference voltage VREF is subtracted from the second voltage V2, which is equivalent to subtracting the direct current voltage corresponding to the static operating current Is, and hence the fourth voltage V4 is derived. The fourth voltage V4 is demodulated by the demodulation module 70 to derive the first output voltage VOUT. The demodulation logic is as follows: when the first pulse signal is 1, VOUT=V4; and when the first pulse signal is 0, VOUT=−V4. Accordingly, the modulation module 10 and the demodulation module 70 have the same logic as follows: when the first pulse signal is 1, the input and the output (of the modulation module 10 or the demodulation module 70) are the same; and when the first pulse signal is 0, the input and the output (of the modulation module 10 or the demodulation module 70) are reverse to each other.

In summary, in this embodiment, by modulating the input voltage VIN to the first voltage V1 with the average value of 0, the change of the average value V20 of the second voltage V2 only reflects the change of the electro-optic conversion coefficient K, and the change is nothing to do with what signal is the input voltage VIN. Hence, even if in the event of the input voltage VIN that is complex, the electro-optic conversion coefficient K is accurately determined as long as the average value V20 is derived. In addition, by defining the reference voltage VREF, the electro-optic conversion coefficient of the entire laser signal transmission system 100 is defined, and even if the laser diode is subjected to the temperature drift, the electro-optic conversion coefficient of the entire laser signal transmission system 100 is maintained stable, such that the laser signal transmission system 100 has a higher transmission accuracy. Furthermore, the demodulation module 70 demodulates the fourth voltage V4, and the first output voltage VOUT in direct proportion to the input voltage VIN is generated, that is, the transmission course of the laser signal is implemented.

Besides, as illustrated by a curve L26 in FIG. 9, the first output voltage VOUT output upon the demodulation may be subject to high-frequency glitch noise (vertical lines on the curve L26). In this case, a second low-pass filter module may be added after the demodulation module 70 to filter the high-frequency glitch noise.

Figure 10:
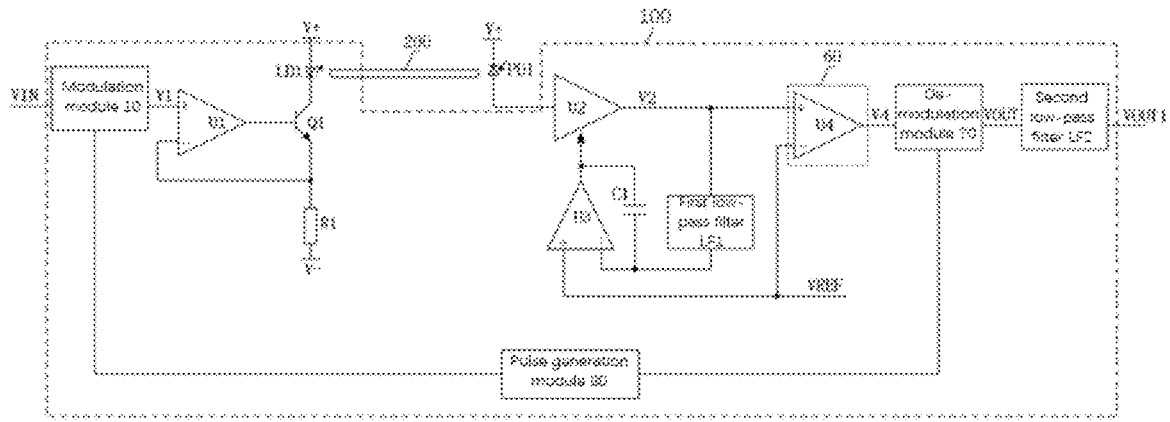
FIG. 10 is a schematic structural diagram of circuitry of a laser signal transmission system according to a fourth embodiment of the present disclosure.

As illustrated in FIG. 10, the laser signal transmission system 100 further includes a second low-pass filter LF2. The second low-pass filter LF2 is connected to the demodulation module 70.

Specifically, the second low-pass filter LF2 is configured to perform low-pass filtering on the first output voltage VOUT, and output a second output voltage VOUT1. Still referring to FIG. 9 again, a curve L27 represents the second output voltage VOUT1. A smooth waveform derived upon low-pass filtering on the first output voltage VOUT is the second output voltage VOUT.

Figure 11:
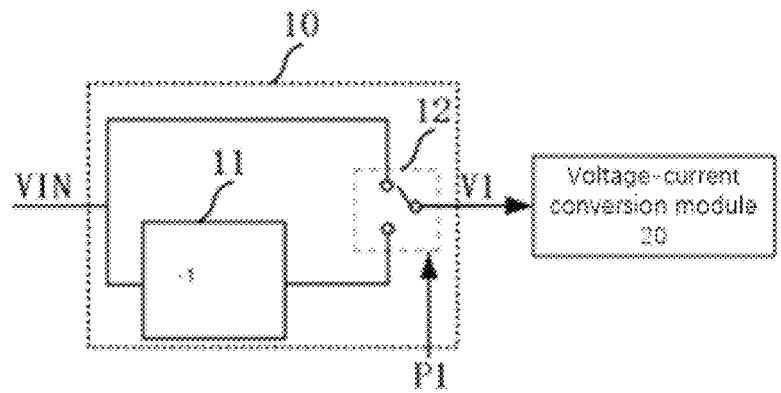
FIG. 11 is a schematic structural diagram of a modulation module according to the first embodiment of the present disclosure.

Referring to FIG. 11, FIG. 11 illustrates another structure of the modulation module 10 according to an embodiment of the present disclosure. As illustrated in FIG. 11, the modulation module 10 includes an inverter 11 and a switch 12.

An input terminal of the inverter 11 is connected to the input voltage VIN and a first terminal of the switch 12, an output terminal of the inverter 11 is connected to a second terminal of the switch 12, a third terminal of the switch 12 is connected to the voltage-current conversion module 20, and the switch 12 is controlled by a first pulse signal P1.

Specifically, the inverter 11 is configured to invert a phase of the input voltage VIN. The switch 12 is configured to establish a connection between the input voltage VIN and the voltage-current conversion module 20 in response to the first pulse signal P1 being at a high level, and is configured to establish a connection between the output terminal of the inverter 11 and the voltage-current conversion module 20 in response to the first pulse signal P1 being at a low level. In this way, when the first pulse signal P1 is 1, V1=VIN; and when the first pulse signal P1 is 0, V1=-VIN.

Figure 12:
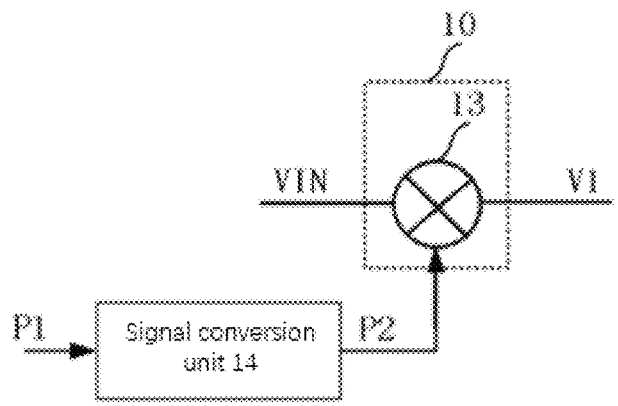
FIG. 12 is a schematic structural diagram of a modulation module according to the second embodiment of the present disclosure.

Referring to FIG. 12, FIG. 12 illustrates another structure of the modulation module 10 according to an embodiment of the present disclosure. As illustrated in FIG. 12, the modulation module 10 includes a multiplier 13 and a signal conversion unit 14.

The signal conversion unit 14 is connected to the pulse generation module 80. The signal conversion unit 14 is configured to convert the first pulse signal P1 to a second pulse signal P2. Voltages corresponding to a high level and a low level of the second pulse signal P2 are equal but with opposite polarities. For example, the voltages corresponding to the high level and the low level of the second pulse signal P2 are respectively 1 V and −1 V.

The multiplier 13 is connected to both the input voltage VIN and the signal conversion unit 14. The multiplier 13 is configured to output products of the input voltage VIN and the second pulse signal P2. When the voltages corresponding to the high level and the low level of the second pulse signal P2 are respectively 1V and −1 V, the products of the input voltage VIN and the second pulse signal P2 are respectively VIN and −VIN. Likewise, eventually, when the first pulse signal P1 is 1, V1=VIN; and when the first pulse signal P1 is 0, V1=-VIN.

In some embodiments, the voltages corresponding to the high level and the low level of the first pulse signal P1 are respectively defined as 2 V and 0 V. In an embodiment, the signal conversion unit 14 may include a coupling capacitor. The coupling capacitor is capable of filtering a direct current component in the first pulse signal P1 to derive the second pulse signal P2 with the voltage +1 V at the high level and the voltage-1 V at the low level. In other embodiments, the signal conversion unit 14 may be a subtracter to subtract a fixed voltage of 1 V from the first pulse signal P1. In this case, likewise, the second pulse signal P2 with the voltage +1 V at the high level and the voltage-1 V at the low level is derived. Nevertheless, the signal conversion unit 14 may also be practiced in other fashions, which is not limited in the embodiments of the present disclosure.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

The invention claimed is:

1. A laser signal transmission system, comprising:
    a modulation module, connected to an input voltage and configured to modulate the input voltage and output a first voltage, wherein an average value of the first voltage within a first duration is 0, and the first duration is greater than or equal to one modulation period;
    a voltage-current conversion module, connected to the modulation module and configured to output a first current based on the first voltage;
    an electro-optic conversion module, connected to the voltage-current conversion module and configured to output an optical signal corresponding to the first current, wherein the optical signal is transmitted over an analog optical fiber;
    an optic-electro conversion module, configured to receive the optical signal from the analog optical fiber and output a second voltage based on the optical signal; and
    a control module, connected to the optic-electro conversion module and configured to determine an average value of the second voltage and determine an electro-optic conversion coefficient of the electro-optic conversion module based on the average value of the second voltage;
    wherein the optic-electro conversion module is further configured to output a third voltage corresponding to the optical signal, and amplify the third voltage and output the second voltage; and
    the control module is further configured to receive a reference voltage, and adjust a magnification at which the third voltage is amplified by the optic-electro conversion module until it is determined that the reference voltage is equal to the average value of the second voltage.

2. The system according to claim 1, wherein the control module is further configured to:
    acquire a threshold current of the electro-optic conversion module, wherein in response to a current flowing through the electro-optic conversion module being less than the threshold current, the electro-optic conversion module stops operating; acquire a static operating current of the electro-optic conversion module, wherein in response to the input voltage being 0, the current flowing through the electro-optic conversion module is the static operating current; and
    determine the electro-optic conversion coefficient as below formula: $K=V20/(Is-Ith)$, wherein K represents the electro-optic conversion coefficient, V20 represents the average value of the second voltage, Is represents the static operating current, and Ith represents the threshold current.

3. The system according to claim 1, further comprising: a subtraction module; wherein the subtraction module is connected to the optic-electro conversion module, and is configured to receive the reference voltage and output a fourth voltage based on a difference between the second voltage and the reference voltage.

4. The system according to claim 3, further comprising: a demodulation module; wherein the demodulation module is connected to the subtraction module, and is configured to demodulate the fourth voltage and drive a first output voltage, wherein a demodulation logic of the demodulation module is the same as a modulation logic of the modulation module.

5. The system according to claim 4, further comprising: a pulse generation module: wherein the pulse generation module is connected to the modulation module and the demodulation module, and is configured to output a first pulse signal to the modulation module and the demodulation module, wherein a duty cycle of the first pulse signal is 50%.

6. The system according to claim 5, wherein the modulation module comprises an inverter and a switch; wherein an input terminal of the inverter is connected to the input voltage and a first terminal of the switch, an output terminal of the inverter is connected to a second terminal of the switch, a third terminal of the switch is connected to the voltage-current conversion module, and the switch is under control of the first pulse signal;
the inverter is configured to invert the input voltage; and
the switch is configured to establish a connection between the input voltage and the voltage-current conversion module in response to the first pulse signal being at a high level, and is configured to establish a connection between the output terminal of the inverter and the voltage-current conversion module in response to the first pulse signal being at a low level.

7. The system according to claim 5, wherein the modulation module comprises a multiplier and a signal conversion unit; wherein
the signal conversion unit is connected to the pulse generation module, and is configured to convert the first pulse signal to a second pulse signal, wherein voltages corresponding to a high level and a low level of the second pulse signal are equal but with opposite polarities; and
the multiplier is connected to the input voltage and the signal conversion unit, and is configured to output a product of the input voltage and the second pulse signal.

8. The system according to claim 1, wherein the voltage-current conversion module comprises a first amplifier, a power transistor, and a resistor; wherein
a first input terminal of the first amplifier is connected to the modulation module, a second input terminal of the first amplifier is connected to an emitter of the power transistor and a first terminal of the resistor, an output terminal of the first amplifier is connected to a base of the power transistor, a collector of the power transistor is connected to a first terminal of the electro-optic conversion module, a second terminal of the electro-optic conversion module is connected to a positive power source, and a second terminal of the resistor is connected to a negative power source; and
the first amplifier is configured to amplify the first voltage and input the amplified first voltage to the power transistor, such that the power transistor is turned on and the first current is generated, wherein the first current flows through the resistor and the electro-optic conversion module.

9. The system according to claim 1, wherein the electro-optic conversion module comprises a laser diode; wherein a first terminal of the laser diode is connected to a positive power source, and a second terminal of the laser diode is connected to the voltage-current conversion module.

10. The system according to claim 1, wherein the optic-electro conversion module comprises a photodiode and a second amplifier; wherein the photodiode is configured to receive the optical signal from the analog optical fiber, and convert the optical signal to the third voltage; and the second amplifier is connected to the photodiode, and is configured to amplify the third voltage and output the second voltage.

11. The system according to claim 1, wherein the control module comprises a first low-pass filter, a first capacitor, and a third amplifier; wherein
an input terminal of the first low-pass filter is connected to the optic-electro conversion module, an output terminal of the first low-pass filter is connected to a first terminal of the first capacitor and a second input terminal of the third amplifier, the reference voltage is input to a first input terminal of the third amplifier, and an output terminal of the third amplifier is connected to a second terminal of the first capacitor and the optic-electro conversion module;
the first low-pass filter is configured to perform low-pass filtering on the second voltage to output the average value of the second voltage to the third amplifier; and
a combination of the third amplifier and the first capacitor is configured to adjust, based on the reference voltage and the average value of the second voltage, the magnification at which the third voltage is amplified by the optic-electro conversion module until the reference voltage is equal to the average value of the second voltage.

12. A laser signal transmission system, comprising:
a modulation module, connected to an input voltage and configured to modulate the input voltage and output a first voltage, wherein an average value of the first voltage within a first duration is 0, and the first duration is greater than or equal to one modulation period;
a voltage-current conversion module, connected to the modulation module and configured to output a first current based on the first voltage;
an electro-optic conversion module, connected to the voltage-current conversion module and configured to output an optical signal corresponding to the first current, wherein the optical signal is transmitted over an analog optical fiber;
an optic-electro conversion module, configured to receive the optical signal from the analog optical fiber and output a second voltage based on the optical signal; and
a control module, connected to the optic-electro conversion module and configured to determine an average value of the second voltage and determine an electro-optic conversion coefficient of the electro-optic conversion module based on the average value of the second voltage;
wherein the average value of the second voltage is correlated to the average value of the first voltage and the electro-optic conversion coefficient.

* * * * *